(12) United States Patent
Deobald et al.

(10) Patent No.: US 10,220,935 B2
(45) Date of Patent: Mar. 5, 2019

(54) OPEN-CHANNEL STIFFENER

(71) Applicant: The Boeing Company, Chicago, IL (US)

(72) Inventors: Lyle R. Deobald, Shoreline, WA (US); Matthew A. Dilligan, Seattle, WA (US); Aaron N. Rinn, Edmonds, WA (US); Madhavadas Ramnath, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 217 days.

(21) Appl. No.: 15/264,324

(22) Filed: Sep. 13, 2016

(65) Prior Publication Data
US 2018/0072400 A1    Mar. 15, 2018

(51) Int. Cl.
*B64C 1/06* (2006.01)
*B64C 3/18* (2006.01)
(Continued)

(52) U.S. Cl.
CPC ............. *B64C 3/26* (2013.01); *B29C 65/48* (2013.01); *B29C 65/52* (2013.01); *B29C 65/54* (2013.01); *B29C 66/0224* (2013.01); *B29C 66/0246* (2013.01); *B29C 66/02242* (2013.01); *B29C 66/02245* (2013.01); *B29C 66/303* (2013.01); *B29C 66/30321* (2013.01); *B29C 66/30325* (2013.01); *B29C 66/474* (2013.01);
(Continued)

(58) Field of Classification Search
None
See application file for complete search history.

(56) References Cited

U.S. PATENT DOCUMENTS

| 1,452,961 A | * | 4/1923 | Dornier | B64C 3/18 |
| | | | | 244/130 |
| 3,071,217 A | * | 1/1963 | Gould | B64C 1/40 |
| | | | | 244/119 |

(Continued)

FOREIGN PATENT DOCUMENTS

| DE | 2908539 A1 | * | 9/1980 | ......... B29C 65/5071 |
| DE | 3509531 C1 | * | 12/1988 | ......... B29C 65/7855 |

(Continued)

OTHER PUBLICATIONS

University of Ljubljana, Lecture 9.1: Thin-Walled Members and Sheeting, online Mar. 2003 (Year: 2003).*

(Continued)

*Primary Examiner* — Jeffrey A Vonch
(74) *Attorney, Agent, or Firm* — Ostrager Chong Flaherty & Broitman PC

(57) ABSTRACT

An open-channel stiffener for stiffening a panel has a bonding flange for bonding the stiffener to the panel through a bondline formed between the bonding flange and the panel to form a stiffened panel. The open-channel stiffener has a cross-sectional shape that aligns, or substantially aligns, a shear center of the stiffener with a centroid of the stiffener and aligns the shear center proximate an edge of the bondline, and removes the need for a radius filler noodle. A plurality of perforations may be formed through the bonding flange to permit an adhesive to wick into the perforations and create a mechanical interlock between the bonding flange and the panel.

19 Claims, 9 Drawing Sheets

(51) Int. Cl.
  *B29C 65/48* (2006.01)
  *B29C 65/52* (2006.01)
  *B29C 65/54* (2006.01)
  *B64C 3/26* (2006.01)
  *B29C 65/00* (2006.01)
  *B64C 3/24* (2006.01)
  *B32B 7/12* (2006.01)
  *B32B 3/26* (2006.01)
  *B32B 3/28* (2006.01)
  *B29D 99/00* (2010.01)
  *B29L 31/30* (2006.01)
  *B29L 31/00* (2006.01)
  *B64C 1/00* (2006.01)

(52) U.S. Cl.
  CPC .............. *B64C 1/06* (2013.01); *B64C 1/064* (2013.01); *B64C 3/18* (2013.01); *B64C 3/182* (2013.01); *B64C 3/185* (2013.01); *B29C 65/527* (2013.01); *B29C 65/542* (2013.01); *B29C 65/546* (2013.01); *B29C 65/548* (2013.01); *B29C 66/10* (2013.01); *B29C 66/20* (2013.01); *B29C 66/30322* (2013.01); *B29C 66/7315* (2013.01); *B29C 66/7392* (2013.01); *B29C 66/7394* (2013.01); *B29D 99/0003* (2013.01); *B29D 99/0014* (2013.01); *B29L 2031/001* (2013.01); *B29L 2031/008* (2013.01); *B29L 2031/3076* (2013.01); *B29L 2031/3082* (2013.01); *B29L 2031/3085* (2013.01); *B32B 3/266* (2013.01); *B32B 3/28* (2013.01); *B32B 7/12* (2013.01); *B32B 2605/18* (2013.01); *B32B 2607/00* (2013.01); *B64C 3/24* (2013.01); *B64C 2001/0072* (2013.01); *Y10T 428/24174* (2015.01); *Y10T 428/24182* (2015.01); *Y10T 428/24322* (2015.01); *Y10T 428/24331* (2015.01); *Y10T 428/24752* (2015.01); *Y10T 428/24777* (2015.01)

(56) References Cited

U.S. PATENT DOCUMENTS

| | | | | |
|---|---|---|---|---|
| 3,995,080 A * | 11/1976 | Cogburn | ................. | B64C 1/064 428/34.5 |
| 3,995,081 A * | 11/1976 | Fant | ..................... | B29C 70/865 428/119 |
| 4,486,372 A | 12/1984 | Millard et al. | | |
| 4,966,802 A * | 10/1990 | Hertzberg | ............. | B29C 65/601 428/119 |
| 5,246,520 A | 9/1993 | Scanlon et al. | | |
| 5,268,055 A | 12/1993 | Bales et al. | | |
| 5,273,606 A * | 12/1993 | Greve | ................. | B62D 27/026 156/216 |
| 5,830,308 A * | 11/1998 | Reichard | ............. | B29C 65/7855 156/291 |
| 6,190,602 B1 | 2/2001 | Blaney et al. | | |
| 6,451,241 B1 | 9/2002 | Ohliger et al. | | |
| 6,766,984 B1 * | 7/2004 | Ochoa | ...................... | B64C 1/12 244/119 |
| 7,115,324 B1 * | 10/2006 | Stol | ......................... | B23K 9/02 428/594 |
| 7,261,026 B2 | 8/2007 | Welch et al. | | |
| 9,387,629 B2 | 7/2016 | Pearson et al. | | |
| 2002/0000492 A1 * | 1/2002 | Schmidt | ................. | B23K 31/02 244/125 |
| 2003/0152745 A1 * | 8/2003 | Wagenblast | ...... | B29C 45/14467 428/119 |
| 2003/0168555 A1 * | 9/2003 | Livi | ........................ | B29C 70/44 244/132 |
| 2005/0244215 A1 * | 11/2005 | Prat | ........................ | F16B 11/006 403/268 |
| 2005/0247818 A1 * | 11/2005 | Prichard | .................. | B64C 1/12 244/1 R |
| 2006/0049552 A1 * | 3/2006 | Fish | ........................ | B29C 65/54 264/571 |
| 2006/0162859 A1 * | 7/2006 | Pridie | ........................ | B64C 3/26 156/285 |
| 2006/0243860 A1 * | 11/2006 | Kismarton | ............ | B29C 65/562 244/132 |
| 2007/0039284 A1 * | 2/2007 | Munoz Royo | .......... | B64C 1/064 52/847 |
| 2007/0051465 A1 * | 3/2007 | Naughton | ............... | B29C 65/54 156/305 |
| 2007/0261787 A1 * | 11/2007 | Malis | ..................... | B29C 65/542 156/285 |
| 2008/0023988 A1 * | 1/2008 | Ochoa | .................... | B62D 33/04 296/191 |
| 2009/0026315 A1 * | 1/2009 | Edelmann | ............. | B29C 70/205 244/119 |
| 2009/0226703 A1 * | 9/2009 | Zheng | ........................ | C09J 5/00 428/320.2 |
| 2009/0266936 A1 * | 10/2009 | Fernandez | ............. | B64C 1/061 244/119 |
| 2009/0311549 A1 * | 12/2009 | Fernandez | ......... | B23K 20/1255 428/594 |
| 2010/0112283 A1 | 5/2010 | Howarth et al. | | |
| 2010/0122868 A1 | 5/2010 | Chiou et al. | | |
| 2010/0133380 A1 * | 6/2010 | Roebroeks | ............... | B32B 15/08 244/119 |
| 2010/0148004 A1 * | 6/2010 | Beumler | ................. | B32B 15/14 244/119 |
| 2010/0181427 A1 * | 7/2010 | Makela | ................... | B64C 3/187 244/123.12 |
| 2010/0242256 A1 * | 9/2010 | Gorr | ........................ | B64F 5/10 29/527.1 |
| 2010/0297390 A1 * | 11/2010 | Forzan | ..................... | B64C 1/064 428/119 |
| 2011/0031643 A1 | 2/2011 | Hache et al. | | |
| 2011/0290939 A1 * | 12/2011 | Noebel | ..................... | B64C 1/061 244/119 |
| 2012/0025024 A1 | 2/2012 | Robrecht et al. | | |
| 2012/0076989 A1 * | 3/2012 | Bland | ..................... | B29C 70/205 428/174 |
| 2012/0104170 A1 * | 5/2012 | Gallant | ................... | B64C 1/061 244/132 |
| 2012/0279560 A1 * | 11/2012 | Sumida | ................. | H01L 31/042 136/251 |
| 2012/0292448 A1 * | 11/2012 | Beresinski | ............ | B29C 70/222 244/158.1 |
| 2013/0087273 A1 * | 4/2013 | Stehmeier | ............. | B29C 70/545 156/247 |
| 2013/0092792 A1 * | 4/2013 | Oldroyd | ............... | B29C 66/5221 244/119 |
| 2014/0102627 A1 * | 4/2014 | Witte | ....................... | B29B 11/16 156/200 |
| 2014/0196829 A1 * | 7/2014 | Ndagijimana | ........ | F16B 11/006 156/60 |
| 2014/0346179 A1 * | 11/2014 | Bailly | ..................... | B29C 65/542 220/564 |
| 2015/0083861 A1 * | 3/2015 | Alby | ....................... | B64C 1/064 244/119 |
| 2015/0165746 A1 | 6/2015 | Prebil | | |
| 2015/0367929 A1 * | 12/2015 | Mialhe | ..................... | B64C 1/06 244/119 |
| 2017/0144765 A1 * | 5/2017 | Simpson | ................... | B64C 1/18 |

FOREIGN PATENT DOCUMENTS

| | | | | |
|---|---|---|---|---|
| DE | 4126009 A1 * | 2/1993 | ................ | C09J 5/00 |
| DE | 19546743 A1 * | 6/1996 | ................ | C09J 5/00 |
| DE | 10260430 A1 * | 7/2004 | ......... | B29C 66/1142 |
| DE | 102007048283 A1 * | 4/2009 | ............. | B64C 1/064 |
| DE | 102008008200 A1 * | 8/2009 | ......... | B29C 65/1425 |
| EP | 1892079 A1 * | 2/2008 | ......... | B29C 65/5014 |
| FR | 796462 A * | 4/1936 | ............. | B64C 1/061 |

(56) References Cited

FOREIGN PATENT DOCUMENTS

| FR | 868568 | A | * | 1/1942 | ............. B64C 1/064 |
|---|---|---|---|---|---|
| FR | 896588 | A | * | 2/1945 | ............... B64C 3/18 |
| FR | 2736403 | A1 | * | 1/1997 | ........... B29C 65/561 |
| FR | 2943944 | A1 | * | 10/2010 | ............. B29C 70/30 |
| GB | 125748 | A | | 4/1919 | |
| GB | 2043761 | A | * | 10/1980 | ......... B29C 65/5071 |
| JP | 55055824 | A | * | 4/1980 | ........ B29C 66/1122 |
| JP | 57152917 | A | * | 9/1982 | ......... B29C 37/0082 |
| WO | 8102718 | A1 | | 10/1981 | |
| WO | WO-0019112 | A1 | * | 4/2000 | ............. B29C 65/54 |
| WO | WO-2006119732 | A1 | * | 11/2006 | ............. B64C 1/064 |

OTHER PUBLICATIONS

Chintapalli et al., The development of a preliminary structural design optimization method of an aircraft wing-box skin-stringer panels, Apr. 5, 2010, Aerospace Science and Technology, vol. 14, Issue 3, pp. 188-198 (Year: 2010).*

Qui et al., Rear fuselage stiffness design of T-tail, Jun. 2013; Composite Structures, vol. 100, pp. 163-172 (Year: 2013).*

Andrzej Szychowski, A theoretical analysis of the local buckling in thin-walled bars with open cross-section subjected to warping torsion, Mar. 2014, Thin Walled Structures, vol. 76, pp. 42-55 (Year: 2014).*

Rohan Ganapathy, Advanced structures—wing section, beams, bending, shear flow and shear center, Jan. 2015 (Year: 2015).*

European Search Report dated Dec. 1, 2017 in corresponding European Appl. No. 17176910.

* cited by examiner

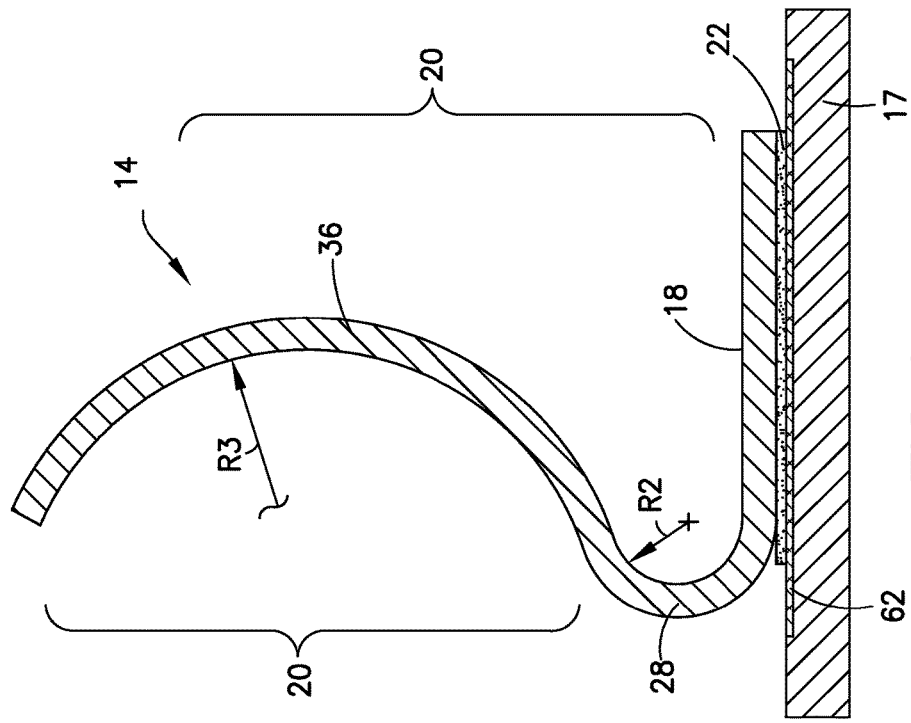
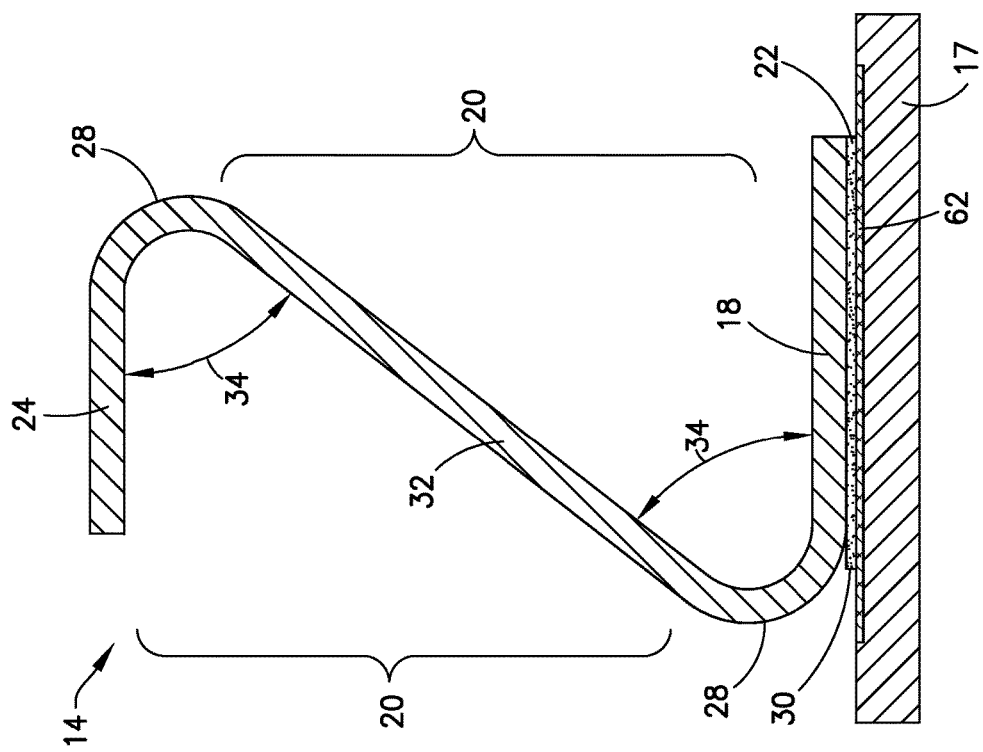

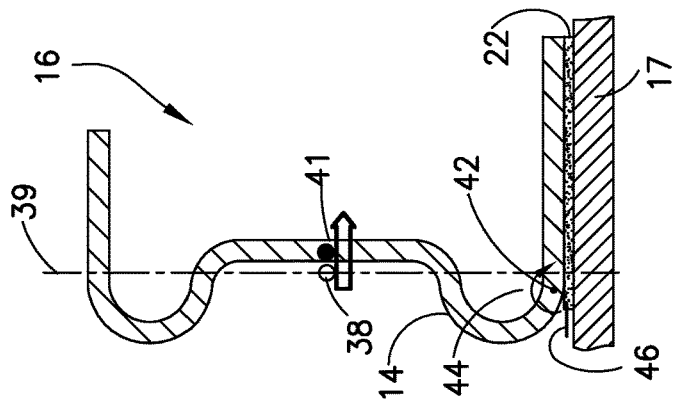
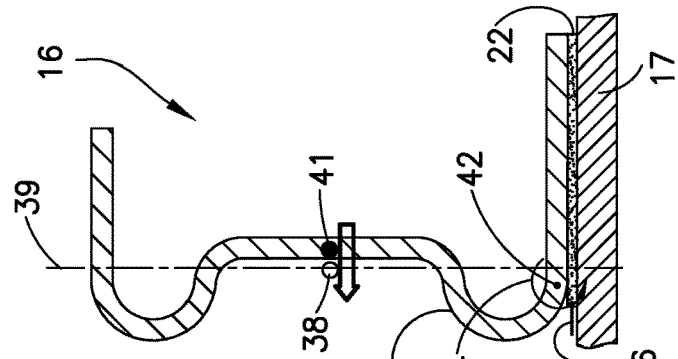
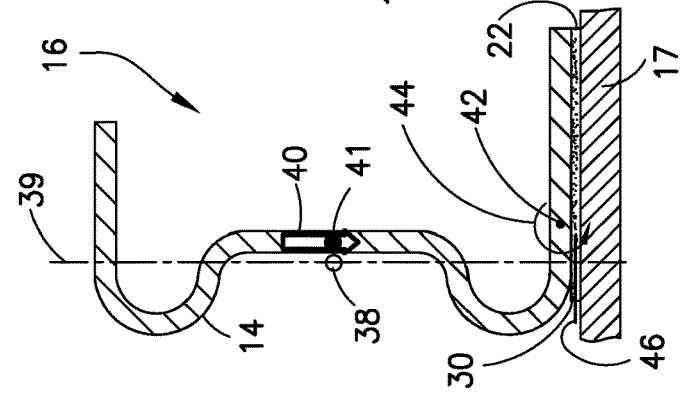
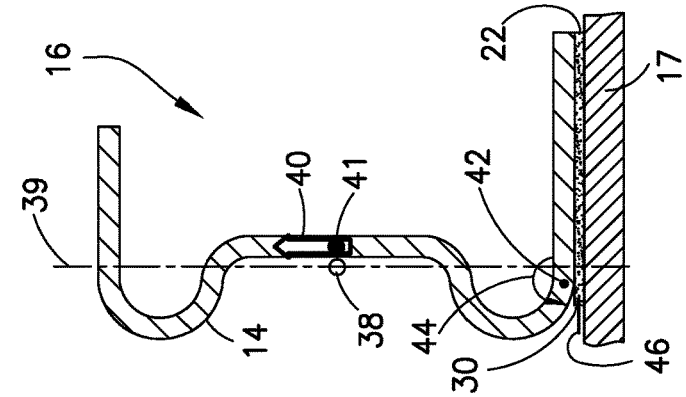

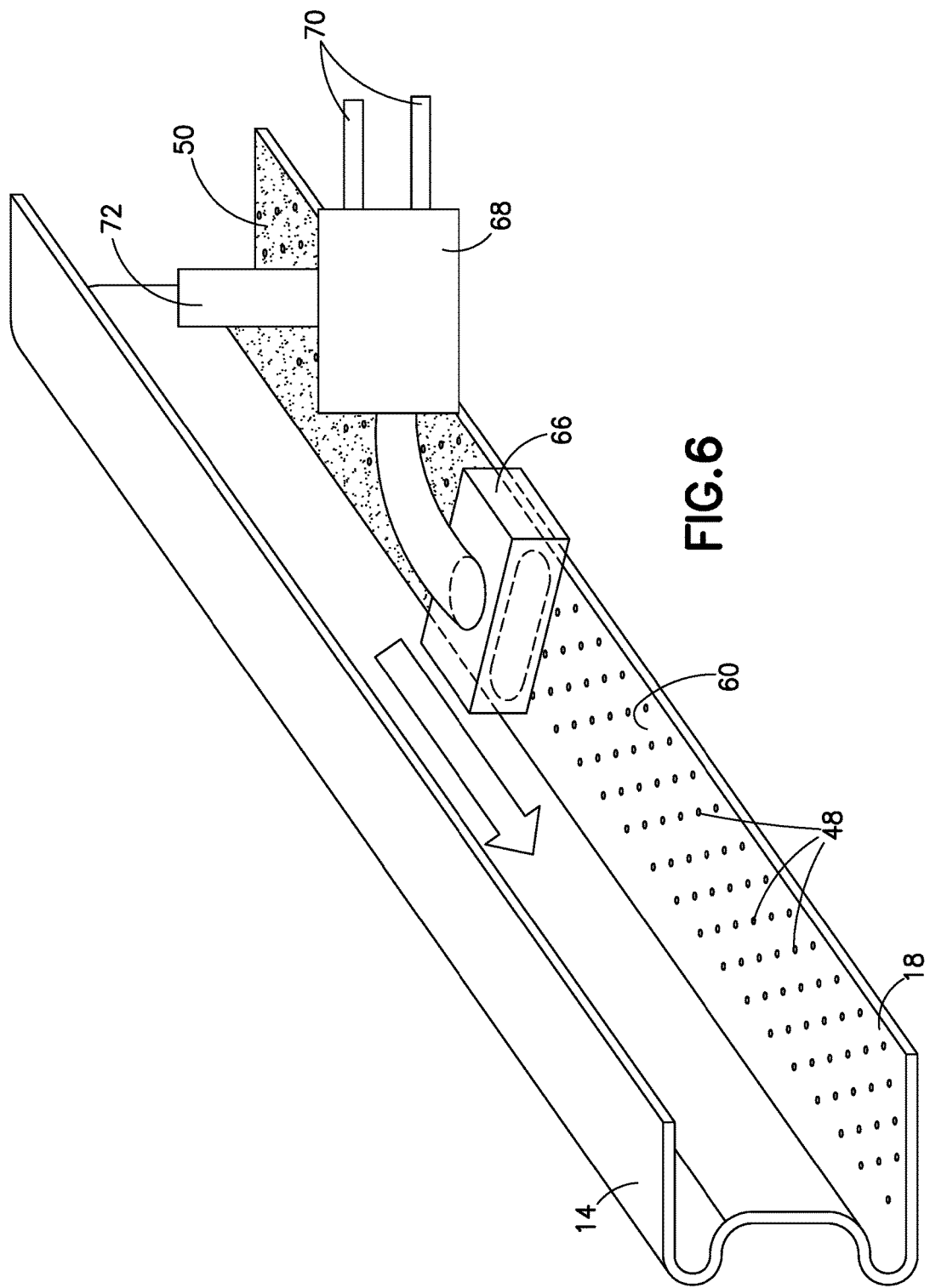

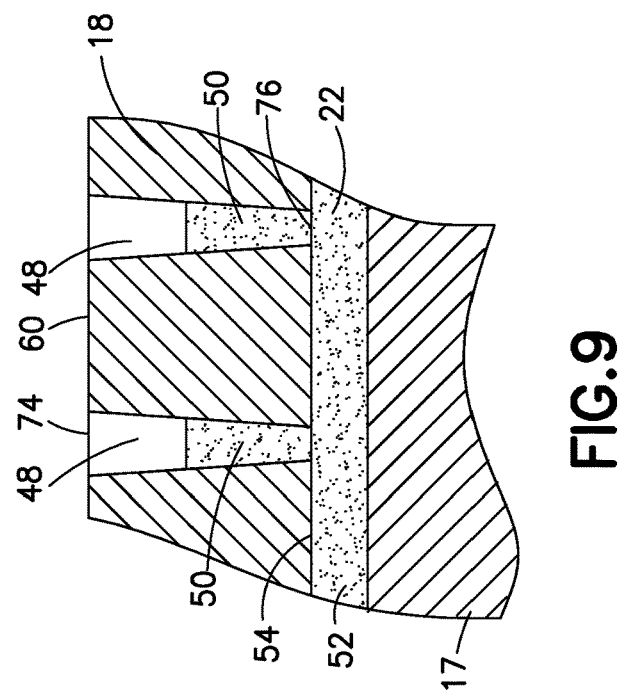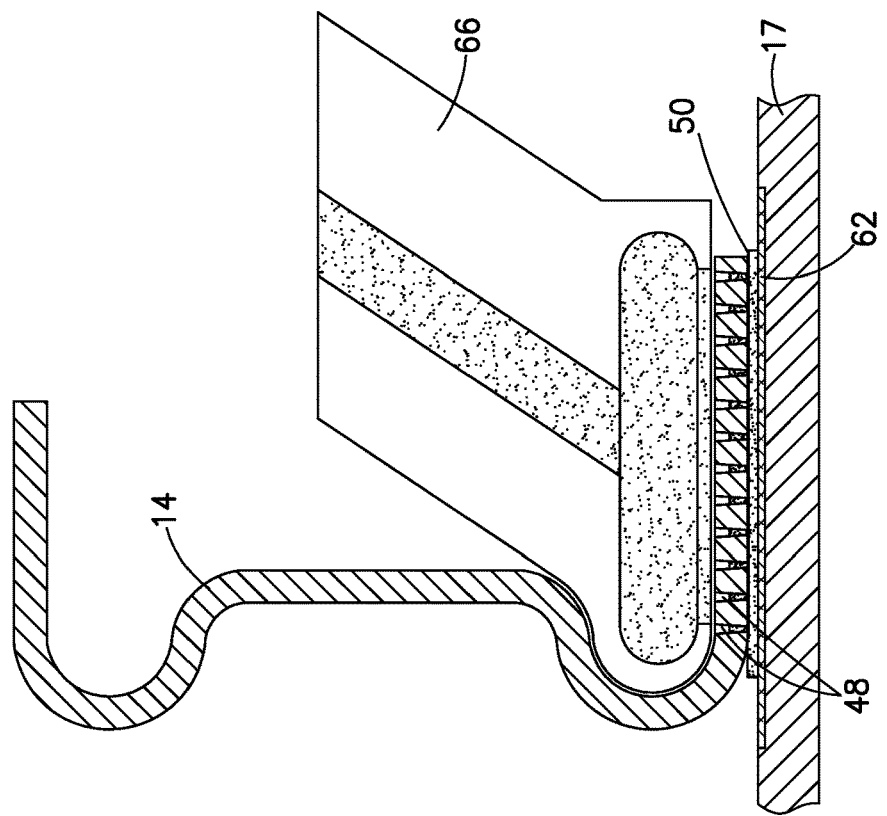

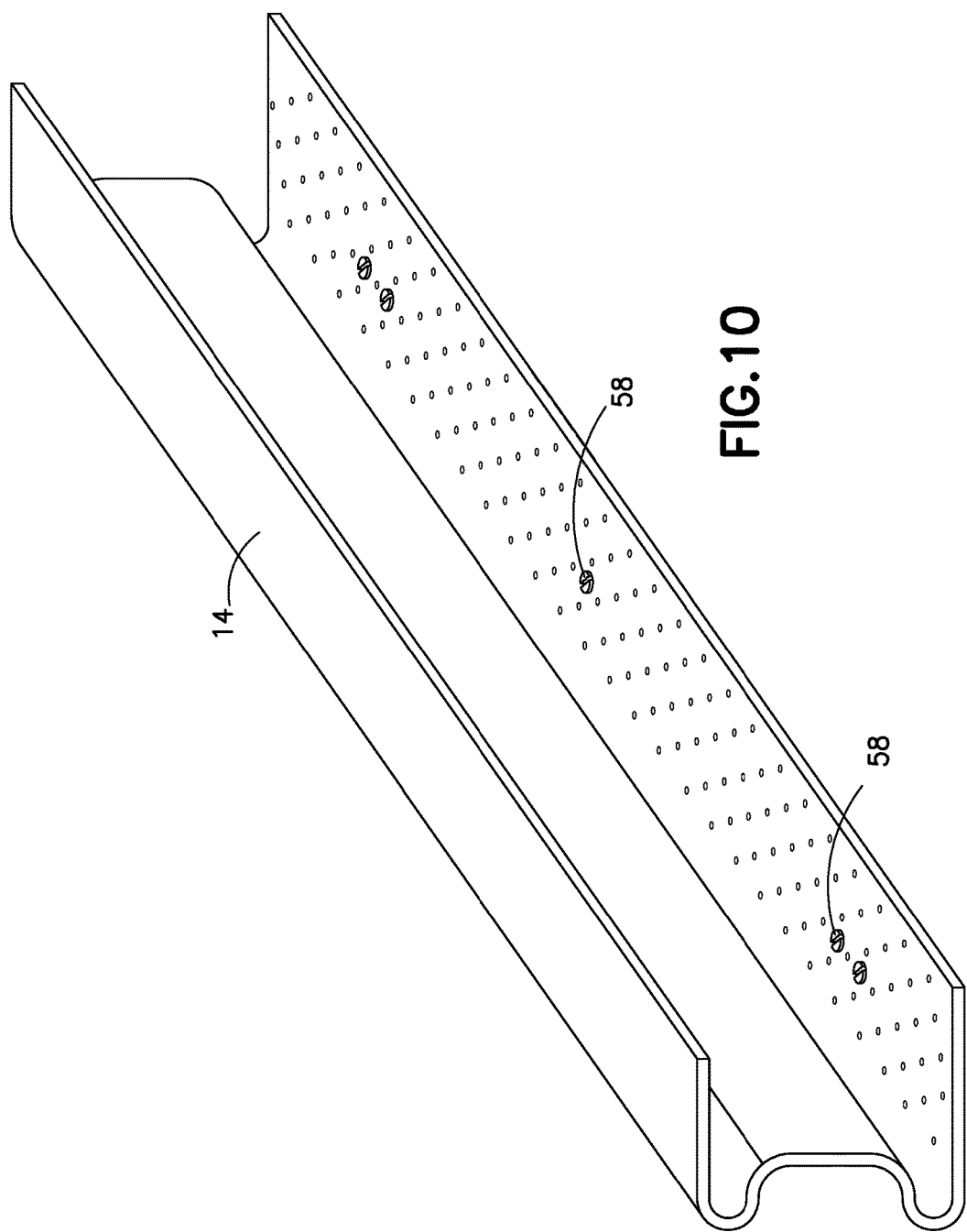

OPEN-CHANNEL STIFFENER

TECHNICAL FIELD

The disclosure relates generally to composite reinforcing support structures and more specifically to low-cost, open-channel stiffener configurations and related methods of stiffening composite panels, such as for use in aircraft.

BACKGROUND

Composite materials are used in a wide variety of applications in many different industries due to their high strength and rigidity, low weight, corrosion resistance and other favorable properties. In the aerospace industry, composite materials have become widely used to manufacture aircraft structures and component parts for aircraft structures, such as aircraft ribs, spars, panels, fuselages, wings, wing boxes, fuel tanks, and tail assemblies, because they are lightweight and strong, and therefore provide fuel economy and other benefits. For example, aircraft wing skins and spar webs, and other generally flat components, may be formed of stiffened composite panels comprising panels to which reinforcing stiffeners may be attached or bonded using mechanical attachment means, co-bonding or co-curing techniques to improve the strength, stiffness, buckling resistance and stability of the composite pressure webs or skin panels. Co-bonding generally refers to bonding processes where a pre-cured reinforcing stiffener would be bonded to an un-cured panel. Co-curing generally refers to bonding processes where an un-cured reinforcing stiffener would be bonded to and cured together at the same time with an un-cured panel. Secondary bonding generally refers to bonding processes where a pre-cured reinforcing stiffener would be bonded to a pre-cured panel.

Known reinforcing stiffeners used with such composite webs or skin panels may include C-beam, I-beam or T-beam stiffeners (i.e., beams with C-shaped, I-shaped or T-shaped cross-sections) or other shaped stiffeners, such as hat-shaped or blade stiffeners. However, stiffened composite panels reinforced with such known stiffeners are costly to form and may experience high pull-off loads at the radius filler, i.e., "noodle", portions of the stiffeners or at the radius common to the attached flange of the reinforcing stiffener in the region of the noodle. As used herein, "pull-off load" means a shear load and/or moment force applied to a composite component part, such as a reinforcing stiffener, at locations where the composite component part is attached or bonded to a structure, such as a composite pressure web or skin panel, such that the shear load and/or moment force may cause delamination or separation of the composite component part from the attached structure. As used herein, "radius filler noodle" means a composite material or adhesive/epoxy material having a generally triangular cross-section that is used to fill a gap left by the radius of curved pieces of a composite component part, such as a reinforcing stiffener.

To decrease the likelihood of delamination or separation of reinforcing stiffeners from composite webs or skin panels due to high pull-off loads, numerous additional radius filler elements, fasteners, and/or angle fittings may be required at the locations or joints where the reinforcing stiffener is attached or bonded to the composite web or skin panel. Such radius filler elements, fasteners, and/or angle fittings may provide additional structural reinforcement to the locations or joints and distribute the shear load and/or moment force in order to reduce the risk of delamination at the radius filler or noodle portions of the reinforcing stiffener. However, use of such numerous additional radius filler elements, fasteners, and/or angle fittings may result in increased production time, increased part count and expense, increased labor and manufacturing costs to install and maintain the parts, and an overall increase in the complexity of the structure. Moreover, the use of fasteners or angle fittings that require mechanical fastening to the reinforcing stiffener or composite web or skin panel may require the formation of appropriately-sized holes in the composite material or structure. This, in turn, may require the use of specialized tooling to form such holes in the composite material or structures. Such specialized tooling may result in further increased labor and manufacturing costs.

Accordingly, there is a need in the art for improved composite stiffeners and improved composite stiffened structures and methods of making the same that provide advantages over known configurations, structures and methods.

SUMMARY

The foregoing purposes, as well as others, are achieved by low-cost, open-channel composite stiffeners that are structurally efficient and exhibit structural behavior to resist disbonding from a panel. The open-channel configurations of the stiffeners position pull-off forces in locations that greatly reduce the forces that may disbond the stiffeners from panels, and remove the need for a radius filler noodle, thus greatly reducing costs and providing manufacturing efficiencies.

In accordance with one example, an open-channel stiffener comprises a bonding flange for bonding the stiffener to a panel through a bondline formed between the bonding flange and the panel. The open-channel stiffener is made from thermoset or thermoplastic composite materials and has a cross-sectional shape configured to align, or substantially align, the shear center (the location of vertical shear force without induced twisting) of the stiffener with the centroid (the location of axial force resultant) of the stiffener to prevent twisting of the stiffener relative to the panel when subjected to bending, and to align the shear center proximate an edge of the bondline. The shear center may be aligned with an edge of the bondline or slightly past or beyond the edge of the bondline. The cross-sectional shape also positions a load moment and reaction point of the stiffener such that it is not over the bondline, i.e, the load moment and reaction point is positioned past or beyond the edges of the bondline.

One configuration of the cross-sectional shape of the open-channel comprises a cap positioned generally parallel to the bonding flange, a web positioned between and generally perpendicular to the cap and the bonding flange, and curved connector portions positioned between the cap and the web and between the web and the bonding flange. The web is positioned over the bondline and the curved connector portions of the stiffener are positioned to extend beyond the edge of the bondline to form a generally M-shaped stiffener with an open channel between the cap and the bonding flange. Another configuration of the cross-sectional shape of the open-channel stiffener that satisfies the above requirements comprises a cap positioned generally parallel to the bonding flange, a web positioned at an acute angle relative to and between the cap and the bonding flange, and curved connector portions positioned between the cap and the web and between the web and the bonding flange to form a generally Z-shaped stiffener with open channels on both sides of the acutely angled web. The web is positioned over the bondline and at least one of the curved connector portions is positioned to extend beyond the edge of the bondline. In yet another exemplary configuration of the cross-sectional shape of the open-channel stiffener, the cross-sectional shape comprises a curved web positioned over the bondline and a curved connector portion having a radius smaller than a radius of the curved web positioned between the curved web and the bonding flange, the curved connector portion extending beyond the edge of the bondline to form a generally S-shaped stiffener.

In another configuration, the open-channel stiffener further comprises a plurality of perforations through the bonding flange that permit an adhesive used to bond the stiffener to a panel to wick into the perforations to create a mechanical interlock between the bonding flange and the panel. The perforations also permit the adhesive to be injected under pressure through the perforations from a top surface of the bonding flange and into the interface between the bonding flange and the panel. The perforations create a texture of raised areas on the bonding surface of the bonding flange that provide a flow path for the adhesive between the bonding flange and the panel. The raised areas on the bonding surface of the bonding flange may also be created separately from the perforation process, or raised areas may be formed on the panel at locations where the open-channel stiffener will bonded.

A further aspect of the disclosure relates to a composite stiffened panel comprising the open-channel stiffener disclosed herein bonded to a panel, such as an aircraft wing skin or spar web. The open-channel stiffener comprises a bonding flange for bonding the stiffener to the panel through a bondline formed between the bonding flange and the panel and a cross-sectional shape configured to align, or substantially aligns, the shear center of the stiffener with the centroid of the stiffener and to align the shear center proximate an edge of the bondline. The bonding flange may also have a plurality of perforations that permit an adhesive to wick into the perforations to create a mechanical interlock between the bonding flange and the panel.

A still further aspect of the disclosure relates to a method of making a composite stiffened panel that reduces the likelihood of delamination or separation of a composite stiffener from the panel. The method comprises forming a composite open-channel stiffener with a cross-sectional shape as described above having a bonding flange for bonding the stiffener to the panel through a bondline formed between the bonding flange and the panel, and a configuration that aligns, or substantially aligns, the shear center of the stiffener with the centroid of the stiffener and aligns the shear center proximate an edge of the bondline. The method further comprises bonding the bonding flange of the composite open-channel stiffener to the panel to form the composite stiffened panel. The bonding step comprises applying adhesive on a top surface of the bonding flange to permit the adhesive to flow through perforations formed through the bonding flange and into the bondline to create a mechanical interlock between the bonding flange and the panel.

The features, functions and advantages that have been discussed, as well as other objects, features, functions and advantages of the open-channel stiffener can be achieved independently in various examples of the disclosure or may be combined in yet other examples, further details of which can be seen with reference to the following description and drawings.

BRIEF DESCRIPTION OF DRAWINGS

FIG. 3 is an illustration of a cross-sectional view of a composite stiffened panel with another configuration of an open-channel stiffener in accordance with this disclosure.

FIG. 4 is an illustration of a cross-sectional view of a composite stiffened panel with another configuration of an open-channel stiffener in accordance with this disclosure.

FIGS. 5A to 5D are illustrations of the composite stiffened panel in FIG. 2 showing varying loads that the open-channel stiffener may experience.

FIG. 6 is an illustration of a right side, front and top perspective view of an open-channel stiffener showing an adhesive application process.

FIG. 8 is an illustration of a cross-sectional view of an open-channel stiffener with an adhesive application head.

FIG. 9 is an illustration of close-up view of the bondline formed between the bonding flange of the open-channel stiffener and the panel in a composite stiffened panel.

FIG. 10 is an illustration of a right side, front and top perspective view of an open-channel stiffener showing self tapping fasteners for tacking the stiffener to the panel during the adhesive application and bonding process.

DETAILED DESCRIPTION

Figure 1:
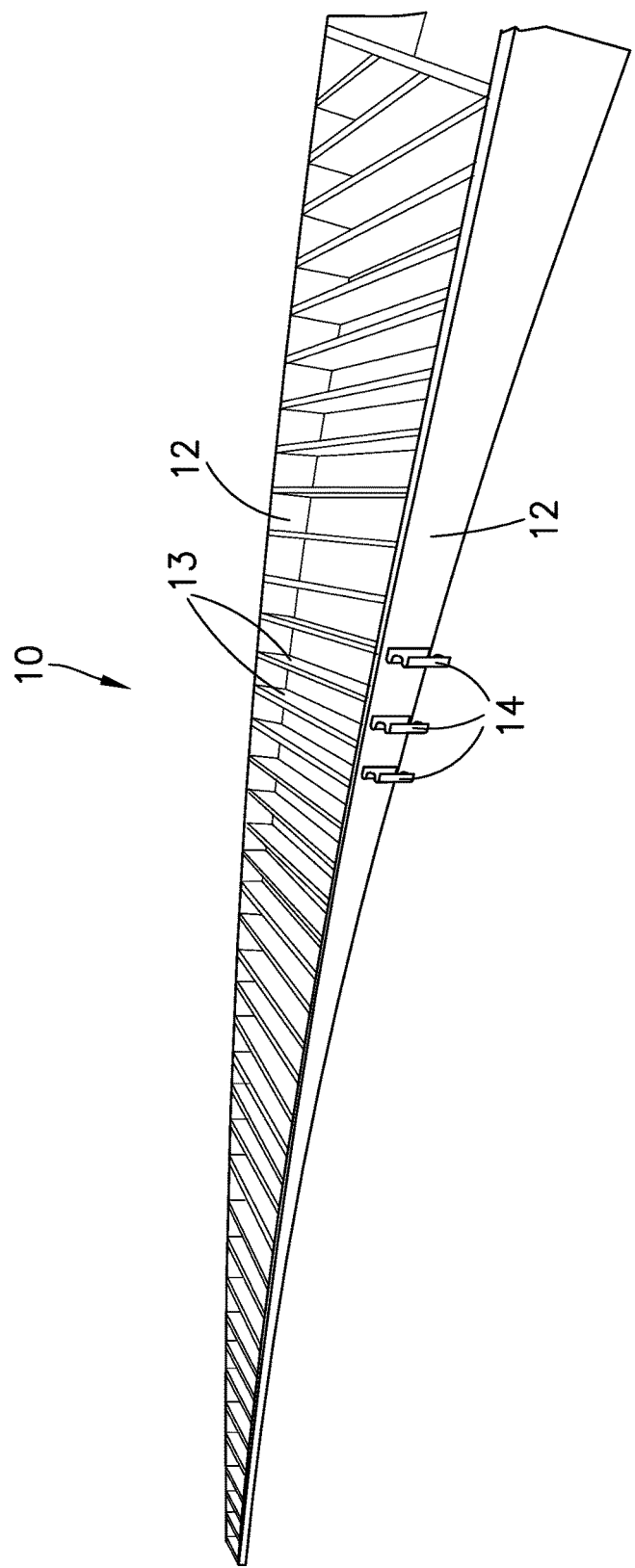
FIG. 1 is an illustration of an aircraft wing box showing front and rear spars stiffened with open-channel stiffeners in accordance with this disclosure.
Figure 1A:
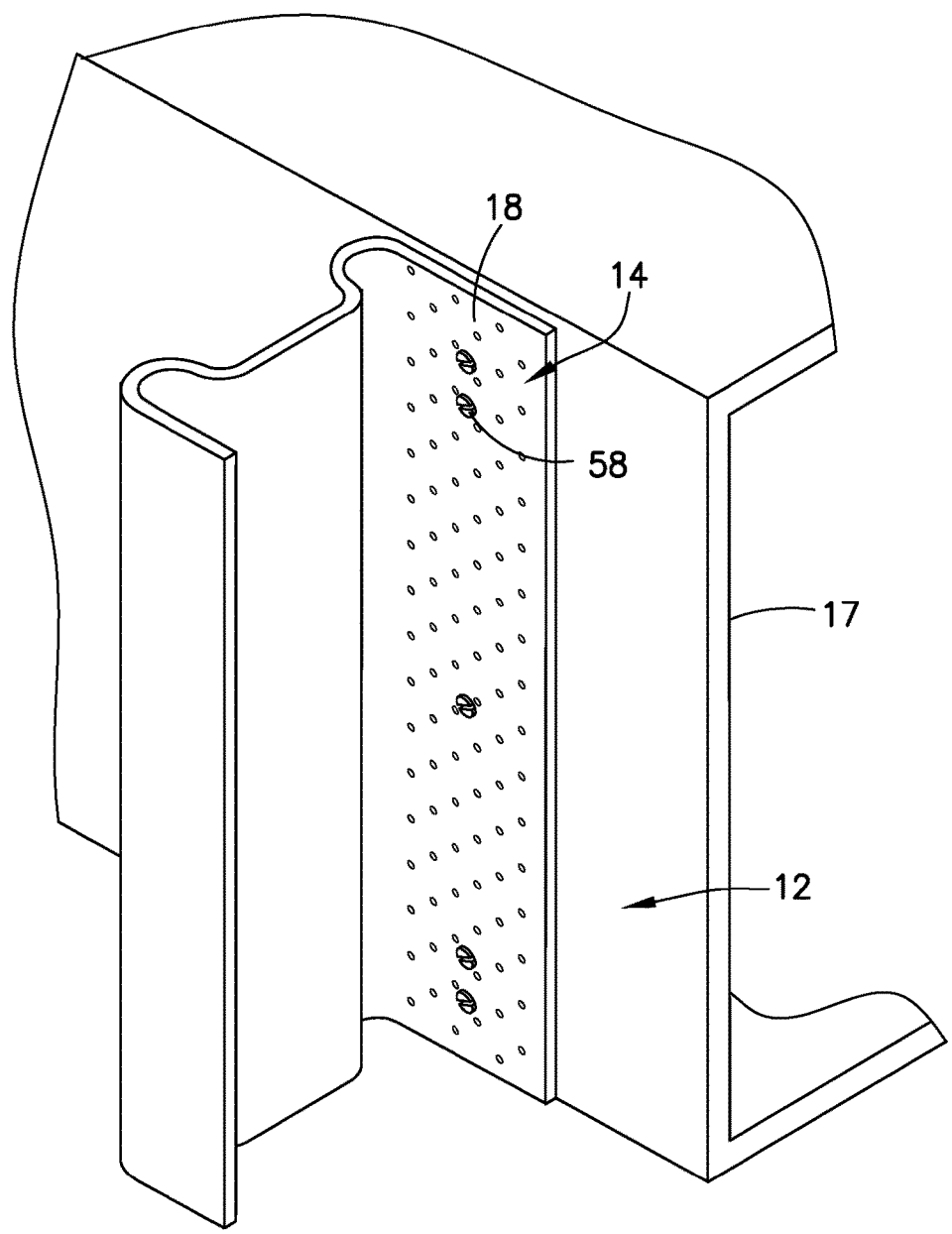
FIG. 1A is an illustration of a close up perspective view of an open-channel stiffener on the aircraft wing box shown in FIG. 1.

In the following detailed description, various examples of open-channel stiffeners and composite stiffened panels that reduce the likelihood of delamination or separation of the open-channel stiffeners from the panels are described with reference to aerospace structures, and more particularly to wing skins and spar webs in aircraft, to illustrate the general principles in the present disclosure. FIGS. 1 and 1A show an exemplary aircraft wing box 10 having front and rear spar webs 12 connected together by a plurality of ribs 13. The front and rear spar webs 12 are composite stiffened with one or more open-channel stiffeners 14 as disclosed herein. The open-channel stiffeners 14 are bonded to outer surfaces of the front and rear spar webs 12. In some applications, the open-channel stiffeners 14 may also be bonded to interior surfaces of the front and rear spar webs 12. The wing skin and other close-out elements of an aircraft wing are not shown. It will be recognized by one skilled in the art that the present disclosure may be practiced in other analogous applications or environments and/or with other analogous or equivalent variations of the illustrative examples. For example, although the aircraft wing box 10 shown in FIGS. 1 and 1A is generally representative of wing boxes used for commercial passenger aircraft, the teachings of this disclosure may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more composite stiffened panels. It should be noted that those methods, procedures, components, or functions which are commonly known to persons of ordinary skill in the field of the disclosure are not described in detail herein.

Figure 2:
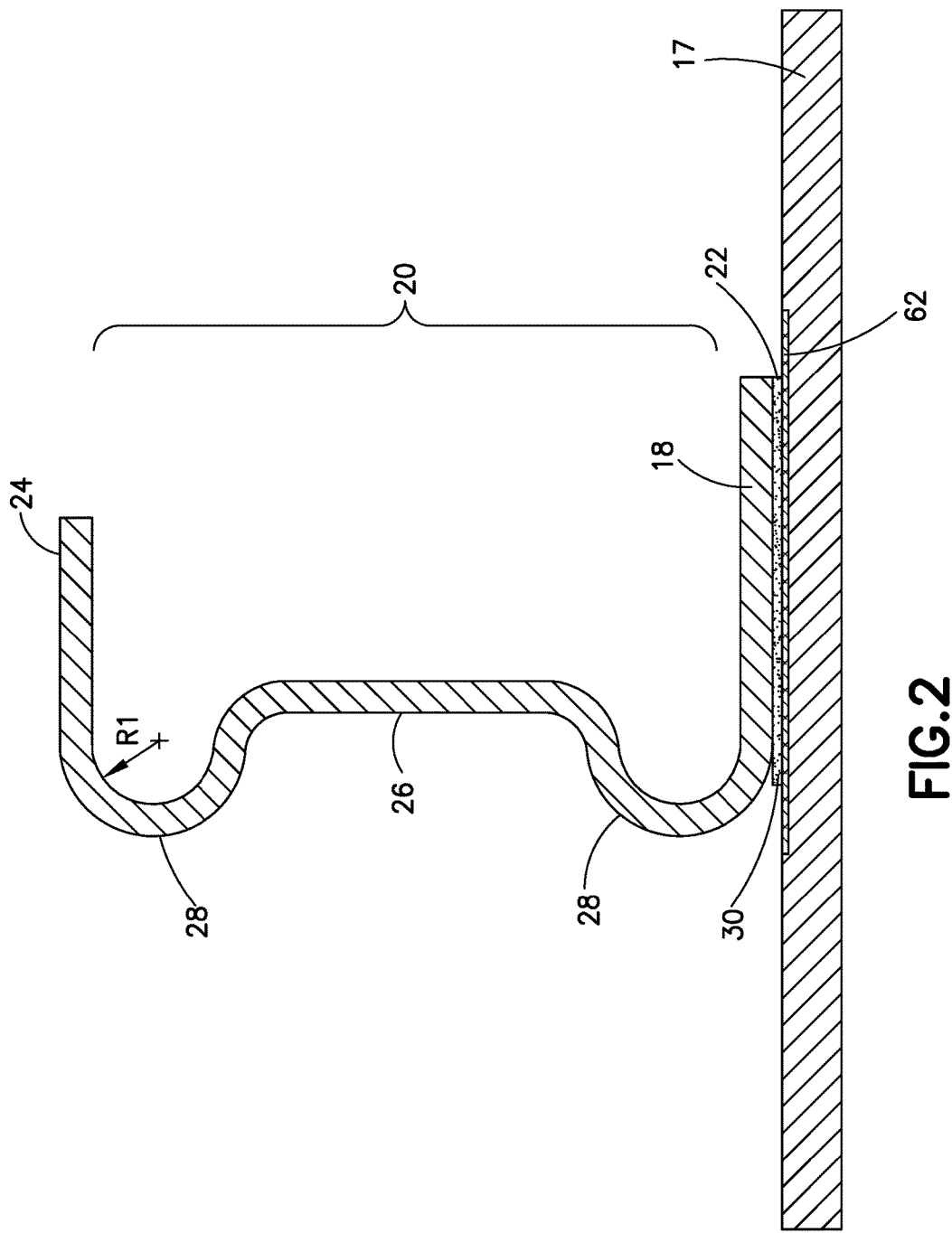
FIG. 2 is an illustration of a top view of a composite stiffened panel with an open-channel stiffener in accordance with this disclosure.

FIG. 2 is an illustration of a cross-sectional view of a composite stiffened panel 16 having an open-channel stiffener 14 bonded to the panel 17. It is contemplated that the panel 17, such as the front and rear spar webs 12 shown in FIG. 1, is a pre-cured composite material comprising reinforcement material surrounded by and supported within a matrix material, such as for example, a prepreg material. The reinforcement material may comprise high-strength fibers, such as glass or carbon fibers, graphite, aromatic polyamide fiber, fiberglass, or another suitable reinforcement material. The matrix material may comprise various polymer or resin materials, such as epoxy, polyester, vinyl ester resins, polyetheretherketone polymer (PEEK), polyetherketoneketone polymer (PEKK), bismaleimide, or another suitable matrix material. As used herein, "prepreg" means a woven or braided fabric or cloth-like tape material, e.g., fiberglass or carbon fibers, that has been impregnated with an uncured or partially cured resin, which is flexible enough to be formed into a desired shape, then "cured," e.g., by the application of heat in an oven or an autoclave, to harden the resin into a strong, rigid, fiber-reinforced structure. The panel 17 preferably comprises carbon fiber reinforced plastic (CFRP) tape or woven fabric, or another suitable composite tape, fabric, or fiber reinforced composite material.

The open-channel stiffener 14 is also a pre-cured composite material comprising one or more layers of reinforcement material surrounded by and supported within a matrix material. The matrix material is preferably a thermoplastic or a thermoset material, both of which are commonly used in the aerospace industry. The primary physical difference between thermoplastic and thermoset materials is that thermoplastics can be re-melted back into a liquid and re-shaped under high temperatures after forming, whereas thermoset plastics always remain in a permanent solid state. Thermoset matrix materials usually include an epoxy based polymer that takes a permanent set when cured.

Any method for making pre-cured thermoplastic or thermoset composite materials may be used. For example, when using thermoplastic composite materials, a thermoplastic composite sheet can be consolidated in an autoclave or press to form the thermoplastic composite sheet in a generally flat configuration. The flat thermoplastic composite sheet can then be press formed into any desired cross-sectional shape that forms the open-channel stiffener 14 disclosed herein, providing manufacturing and cost efficiencies as compared to press forming traditional I-shaped stiffeners. The press formed open-channel stiffener 14 may then be net trimmed in a machining operation. When using thermoset composite materials, uncured sheets of thermoset composite can be layed up on a tool or mandrel having a shaped surface conforming to the desired cross-sectional shapes of the open-channel stiffener 14. The uncured sheets and tool or mandrel can be bagged and cured in an autoclave to form the open-channel stiffener 14, debagged, and then net trimmed in a machine operation.

FIG. 2 shows one configuration of the open-channel stiffener 14 that forms a generally M-shaped cross-sectional shape having an open channel 20. In this configuration, a bonding flange 18 is provided for bonding the open-channel stiffener 14 to the panel 17 through a bondline 22 formed with an adhesive between the bonding flange 18 and the panel 17. A cap 24 is positioned generally parallel to and spaced apart from the bonding flange 18. A web 26 is positioned between and generally perpendicular to the cap 24 and the bonding flange 18. Curved connector portions 28 are positioned between the cap 24 and the web 26 and between the web 26 and the bonding flange 18. The web 26 is positioned over the bondline 22 and the curved connector portions 28 of the open-channel stiffener 14 are positioned to extend beyond an edge 30 of the bondline 22. The thickness of the open-channel stiffener 14 and the length and configuration of each element of the cross-sectional shape can vary depending on the intended application and use. When used for stiffened wing skins or spar webs for commercial aircraft, the height of the open-channel stiffener 14 may be, for example, in the range of about 2 to 3 inches, the length of the bonding flange 18 may be in the range of about 2 to 3.5 inches, the length of the cap 24 may be in the range of about 0.75 inch to 1.5 inch, and the length of the web 26 may be in the range of about 1 to 2 inches, depending on the radii of the curved connector portions 28 and how far over the bondline 22 the web 26 is positioned. Each of the curved connector portions 28 may have a radius R1 in the range of about ⅛ of an inch to about ⅜ of an inch, and both of the curved connector portions 28 preferably have the same radius R1. The open-channel stiffener 14 has a thickness of about 0.1 to 0.3 inch. The open-channel stiffener 14 typically would have a total length that is about the length of panel 17; for example, the open-channel stiffener 14 shown in FIG. 1 extends from approximately a top edge to a bottom edge of the front and rear spar webs 12.

Another configuration of the cross-sectional shape for an open-channel stiffener 14 is shown in FIG. 3. In this configuration, the open-channel stiffener 14 comprises a cap 24 positioned generally parallel to a bonding flange 18, an angled web 32 positioned between the cap 24 and the bonding flange 18 at acute angles 34 relative to the cap 24 and the bonding flange 18. Curved connector portions 28 are positioned between the cap 24 and the angled web 32, and between the angled web 32 and the bonding flange 18, at the acute angles 34 to form a generally Z-shaped stiffener. The angled web 32 is positioned over the bondline 22 between the bonding flange 18 and the composite panel 17. At least one of the curved connector portions 28, the lower curved connector portion 28 shown in FIG. 2, is positioned to extend beyond an edge 30 of the bondline 22. The configuration shown in FIG. 2 provides for two open channels 20, one on each side of the angled web 32.

In yet another configuration of the open-channel stiffener 14 shown in FIG. 4, the open-channel stiffener 14 has a cross-sectional shape comprising a curved web 36 positioned over the bondline 22 and a curved connector portion 28 having a radius R2 smaller than a radius R3 of the curved web 36 positioned between the curved web 36 and the bonding flange 18. The curved connector portion 28 extends beyond an edge 30 of the bondline 22. The curvature of the curved web 36 and the curvature of the curved connector portion 28 are arranged in opposite directions to form a generally S-shaped stiffener.

The disclosed open-channel stiffeners 14 are low-cost stiffeners that are structurally efficient and exhibit structural behavior to resist disbonding from the panel 17. The open-channel configurations of the stiffeners 14 position pull-off forces in locations that greatly reduce the forces that may disbond the stiffeners 14 from panels 17, and remove the need for a radius filler noodle, thus greatly reducing costs and providing manufacturing efficiencies. More particularly, the cross-section configuration of the open-channel stiffeners 14 is configured to balance multiple modes of possible failure, such that forces at a section cut location 42 in the open-channel stiffener 14 that is adjacent a tip 47 of an assumed crack 46 at an edge 30 of the bondline 22 do not have an opening moment, or a twisting force in a direction that could peel the stiffener 14 away from the panel 17. The section cut location 42 is a hypothetical location used to examine the internal forces in the open-channel stiffener 14 adjacent the assumed crack 46. The cross-sectional shape of the open-channel stiffeners 14 also provides improved stability due to the curves in the curved connector portions 28, and positioning a curved connector portion 28 near the bonding flange 18 reduces peak pulloff at ends of the open-channel stiffener 14. The bondline 22 is also visible for Through-Transmission Ultrasonic (TTU) or infrared inspection.

FIGS. 5A-5D illustrate various loads that a composite stiffened panel 16 with an open-channel stiffener 14 may encounter, including pull-off loads away from the panel 17 (FIG. 5A), crush or compressive loads toward the panel 17 (FIG. 5B), sidebend left loads (FIG. 5C) and sidebend right loads (FIG. 5D). The cross-sectional shapes of the open-channel stiffener 14 are configured to align, or substantially align, the shear center 38 (the location of vertical shear force without induced twisting) of the stiffener 14 with the centroid 41 (the location of axial force resultant 44) of the stiffener 14 in a vertical direction to prevent twisting of the open-channel stiffener 14 relative to the panel 17 when subjected to bending. The shear center 38 is also aligned proximate an edge 30 of the bondline 22, either aligned with the edge 30 or about ¼ inch to about ½ inch inward from the edge 30, such that the shear center 38 is over the bondline 22 and the local moment or axial force resultant 44 proximate the edge 30 is a closing moment, as shown in FIGS. 5A-5C. This configuration prevents the assumed crack 46, to the extent it exists at all, from extending past the vertical plane 39 (shown by dotted lines) of the shear center 38. Under pull-off forces as shown in FIG. 5A, formation of the assumed crack 46 is suppressed. Under crush loads as shown in FIG. 5B, the assumed crack 46 is immediately arrested after formation. The side-bend forces are typically a much smaller fraction of the pull-off or crush loads. If such loads exists from one direction (left or right), a designer may configure the mirror image of the open-channel stiffener 14 in the orientation to create closing moments at the section cut location to prevent separation of the open-channel stiffener 14 from the panel 17. A second approach to suppress separation of the open-channel stiffener from the panel 17 is to use higher toughness materials that resist delamination into low toughness tape plies. For example, one or more high toughness fabric composites layers may be placed on the panel 17 to prevent the delamination from migrating into low toughness tape plies.

In other examples of this disclosure, shown in FIGS. 6-9, the open-channel stiffener 14 may optionally comprise a plurality of perforations 48 through the bonding flange 18 that serve a dual purpose—to permit an adhesive 50 to wick into the perforations 48 and to create a mechanical interlock 52 between the bonding flange 18 and the panel 17. The number of perforations, size of perforations, density of the perforations will be determined based upon the viscosity and flow of the adhesive through the perforations. In some examples, perforations can be formed having spacing in the range of 3/16 inch to ½ inch and diameters of about 1/16 to ⅛ inch. Preferably, the perforations are formed to be slightly conical in shape having a smaller diameter at the bonding surface 54 and a larger diameter at top surface 60 of the bonding flange 18 as shown in FIG. 9 to enhance the interlock. For open-channel stiffeners 14 made with thermoplastic composite materials, the perforations 48 are formed through the flat thermoplastic sheet after it is consolidated in an autoclave or press. Any of a wide variety of hot needle perforation equipment and methods available in the plastics industry may be used to form the perforations 48 in an area of the flat thermoplastic sheet that will become the bonding flange 18 when it is press formed into the desired cross-sectional configuration. For open-channel stiffeners 14 made with thermoset composite materials, the perforations 48 are formed by laying up the uncured sheets of thermoset composite on a perforation tool that is included in the shaped layup mandrel that will form the stiffener 14.

Figure 7:
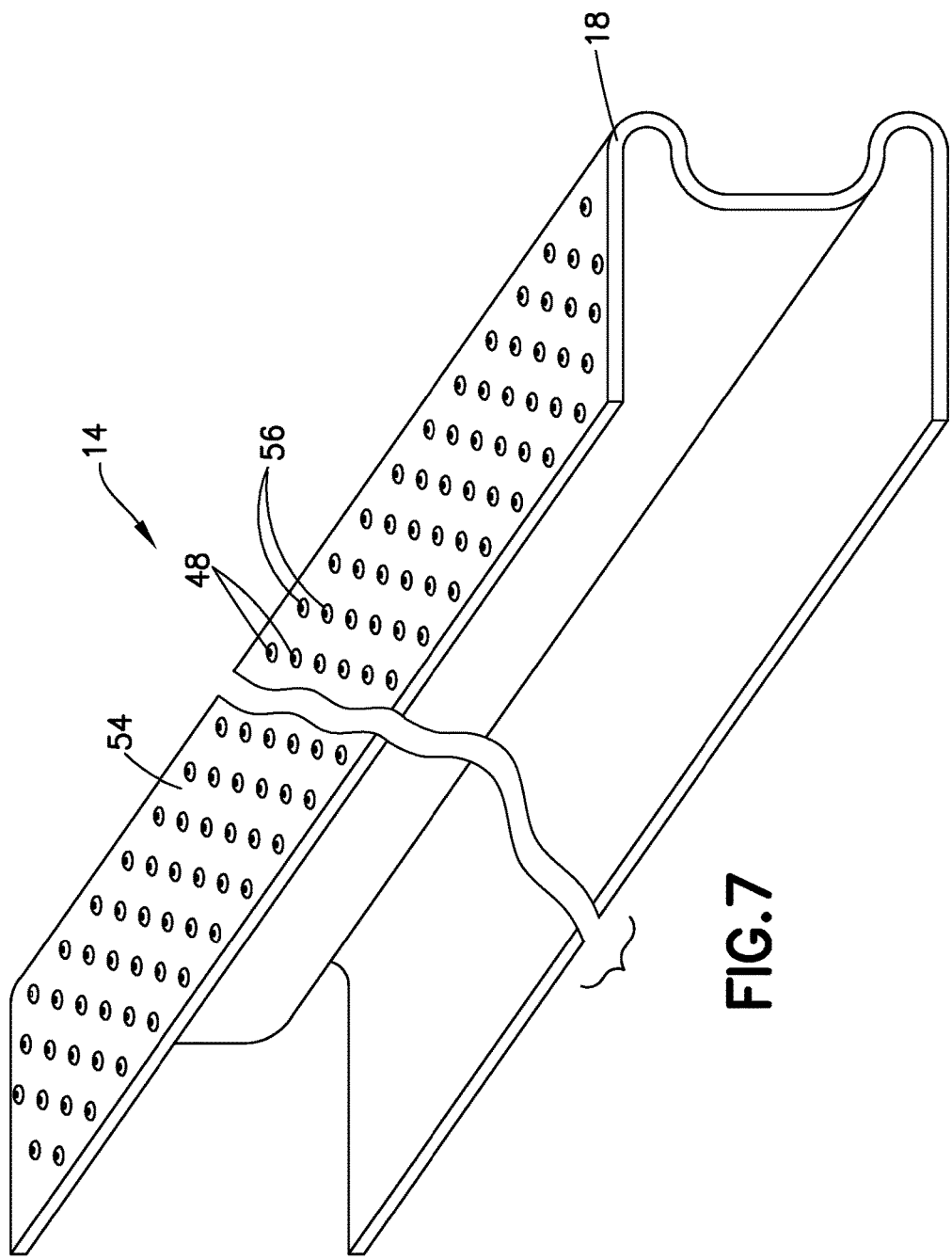
FIG. 7 is an illustration of a right side, front and bottom perspective view of an open-channel stiffener.

Referring to FIG. 7, which shows a bonding surface 54 of the bonding flange 18, the perforations 48 may form a plurality of raised areas 56 or bumps surrounding each perforation 48 that create a raised texture on the bonding surface 54. Alternatively, raised areas 56 may be formed on the bonding surface 54 separate from the perforation process. In other examples, the panel 17 may be formed with bumps similar to the raised areas 56 in an area where the open-channel stiffener 14 will be bonded to panel 17. The raised areas 56 hold the bonding surface 54 of the bonding flange 18 apart from the surface of the panel 17 by a small distance to provide a flow path for the adhesive 50 to flow between the bonding flange 18 and the panel 17 throughout the entire bondline 22 when the open-channel stiffener 14 is positioned onto the panel 17. The raised areas 56 have a height of about 0.005 to 0.010 inch and a diameter in the range from 0.030 to 0.100 inch. The raised areas 56 may also have a pitch or spacing that depends on the thickness of the bonding flange 18. The pitch-to-thickness ratio may be about 4:1 and the pitch may be in the range of about 0.25 to 0.5 inch.

A further aspect of the disclosure relates to a method of making a composite stiffened panel 16 that reduces the likelihood of delamination or separation of a composite stiffener 14 from the panel 17, and provides cost savings and manufacturing efficiencies. The method comprises forming a composite open-channel stiffener 14 with a cross-sectional shape as disclosed above, and bonding the bonding flange 18 of the open-channel stiffener 14 to the panel 17 to form the composite stiffened panel 16. The bonding step includes preparing the bonding surface 54 of the bonding flange 18 and a surface of the panel 17, and applying a room-temperature, high-toughness adhesive 50 that is post-cured in an oven to create a thick bondline 22 to fill gaps and any mis-match in the surface contour of the bonding surface 54 and the surface of the panel. The disclosed bonding process is also compatible with traditional hat-shaped stiffeners.

The bonding surface 54 of a bonding flange 18 made from thermoplastic materials is prepared for bonding with known surface treatments such as plasma etch, grit blast or laser ablation techniques. The bonding surface 54 of the bonding flange 18 made from thermoset materials is prepared with known surface treatments such as plasma, grit blast or sanding techniques. The function of this surface preparation is to 1) mechanically remove the resin rich surface of the composite to remove compounds that inhibit adhesion and 2) chemically activate the composite surface to enhance chemical adhesion of the adhesive to the pre-cured composite surfaces of the open-channel stiffener 14 and the panel 17. The strength of the bonded joint benefits from both the chemical adhesion and the mechanical interlock of the perforations. The panel 17 to be stiffened is typically a thermoset material, and its surface is prepared for bonding with known surface treatments such as grit blast, sanding or peel ply techniques.

After the bonding surface 54 and the surface of the panel 17 are prepared for bonding, the open-channel stiffener 14 is positioned onto the prepared surface of the panel 17 and held in place to maintain its position throughout the bonding process. The stiffener 14 may be held in place by mechanical clamping means or it can be tacked into place with adhesive spot welds, staples or self-tapping fasteners. FIG. 10 shows an open-channel stiffener 14 having a plurality of self tapping fasteners 58 spaced along a length of the stiffener 14. In most circumstances, 3-5 self tapping fasteners 58 would be sufficient per stiffener 14. To install the self tapping fasteners 58, pilot holes should be drilled through the bonding flange 18 and the panel 17. An adhesive may be injected into the pilot holes or applied to the self tapping fasteners 58, and then the self tapping fasteners 58 are driven into the pilot holes. In some examples, a higher toughness thermoset fabric 62 (1 to 3 plies) may be placed between the open-channel stiffener 14 and the panel 17 prior to application of an adhesive 50. The fabric 62 is about twice as tough as the tape laminate of the panel 17 (which is also typically a thermoset composite) to prevent delamination from migrating into weaker laminate tape plies of the panel 17.

Referring to FIGS. 6, 8 and 9, a room-temperature adhesive 50 is applied on a top surface 60 of the bonding flange 18 such that the adhesive 50 flows through the perforations 48 formed through the bonding flange 18 and into the bondline 22 to create a mechanical interlock 52 at the bondline 22 between the bonding flange 18 and the panel 17. The perforations 48 preferably have a conical shape with a larger diameter opening 74 at the top surface 60 of the bonding flange 18 and a smaller diameter opening 76 at the bonding surface 54 of the bonding flange (see FIG. 9). The bondline has a thickness between about 0.005 and 0.1 inch to enable rapid ply drop rates leading to structural efficiency and lower cost. The adhesive 50 may be applied by hand or with automated or robotic application equipment, and preferably is a high-toughness adhesive that is tougher than thermoset composites with $G_{IC}$ values from about 3.0 to 7.0 in-lb/in$^2$. An exemplary automated adhesive applicator 64 has an adhesive mixing and application head 66 that is positioned to glide along the top surface 60 of the bonding flange 18, and comprises a mixer 68 with inputs 70 for a resin and a catalyst that mix together to form the adhesive 50 and a robotic end effector 72. The application head 66 applies adhesive 50 to the top surface 60 of the bonding flange 18 under sufficient pressure to inject or wick the adhesive 50 through the perforations 48 and into the interface between the bonding flange 18 and the panel 17 until adhesive 50 is visible at an edge of the bonding flange 18, or until an infrared camera detects that the adhesive 50 fully fills the bondline 22. The adhesive 50 is formulated to have an exothermic reaction that is a good infrared source to aid inspection.

The entire adhesive application process is to be done at room temperature to provide manufacturing efficiencies. Any adhesive 50 that bleeds past an edge of the bonding flange 18 may or may not be wiped off. The foregoing process is repeated for additional open-channel stiffeners 14 to be bonded to the panel 17. The adhesive 50 will cure in place in about 15 minutes to 1 hour. The panel 17 with one or more bonded open-channel stiffeners 14 is then passed through an oven heated to about 250° F. to further cure the adhesive 50 and raise the glass transition temperature (Tg) to a desired temperature for a particular application. The foregoing method requires minimal tooling for positioning, tacking and bonding the open-channel stiffener 14 to the panel 17 to form the composite stiffened panel 16, resulting in cost savings and other manufacturing efficiencies.

Many other modifications and variations may of course be devised given the above description for implementing the principles in the present disclosure. For example, and without limitation, the cross-sectional configurations may include variable thicknesses in different portions of the configuration, such as the cap may be thicker than the web, to provide additional bending stiffness and stability while maintaining the shear center over the bondline. The proposed cross-sectional shapes of the open-channel stiffener 14 may vary in height-to-width aspect ratio, may vary in degree of symmetry and may be mirror image. Additionally, the open-channel stiffener 14 may be bonded to panels of various configurations incorporating various layups and thickness, or solid laminate or sandwich structure. It is intended that all such modifications and variations be considered as within the spirit and scope of this disclosure, as defined in the following claims.

The invention claimed is:

1. An open-channel stiffener for stiffening a panel, the open-channel stiffener comprising a bonding flange having a width defined by two longitudinal edges for bonding the stiffener to the panel through a bondline formed between the bonding flange and the panel, the stiffener having a cross-sectional shape comprising a curved connector portion extending from one of the longitudinal edges and a web extending from the curved connector portion, the web positioned over the bondline and the curved connector portion positioned to extend beyond an edge of the bondline, and the cross-sectional shape is configured to substantially align a shear center of the stiffener with a centroid of the stiffener and to align the shear center proximate the edge of the bondline.

2. The stiffener of claim 1, further comprising a plurality of perforations through the bonding flange that permit an adhesive to wick into the perforations to create a mechanical interlock between the bonding flange and the panel.

3. The stiffener of claim 2, further comprising a plurality of raised areas that create a texture on a bonding surface of the bonding flange to provide a flow path for an adhesive between the bonding flange and the panel.

4. The stiffener of claim 2, wherein the plurality of perforations have a larger diameter opening on a top surface of the bonding flange and a smaller diameter opening on a bonding surface of the bonding flange.

5. The stiffener of claim 1, wherein the cross-sectional shape of the stiffener further comprises a cap positioned generally parallel to the bonding flange and over the bondline, the web positioned between and generally perpendicular to the cap and the bonding flange, and a second curved connector portion extending between the cap and the web.

6. The stiffener of claim 5, wherein the second curved connector portion is positioned to extend beyond the edge of the bondline.

7. The stiffener of claim 1, wherein the stiffener is comprised of a thermoplastic or thermoset material.

8. The stiffener of claim 1, wherein the cross-sectional shape of the stiffener further comprises a cap positioned generally parallel to the bonding flange and over the bondline, the web positioned between and at an acute angle relative to the bonding flange and the cap, and a second curved connector portion extending between the cap and the web.

9. The stiffener of claim 1, wherein the web comprises a curved web and the curved connector portion having a radius smaller than a radius of the curved web.

10. A stiffened panel comprising an open-channel stiffener bonded to a panel, the open-channel stiffener comprising a bonding flange having a width defined by two longitudinal edges for bonding the stiffener to the panel through a bondline formed between the bonding flange and the panel, the stiffener having a cross-sectional shape comprising a curved connector portion extending from one of the longitudinal edges and a web extending from the curved connector portion, the web positioned over the bondline and the curved connector portion positioned to extend beyond an edge of the bondline, and the cross-sectional shape is configured to substantially align a shear center of the stiffener with a centroid of the stiffener and to align the shear center proximate the edge of the bondline.

11. The stiffened panel of claim 10, wherein the bonding flange has a plurality of perforations that permit an adhesive to wick into the perforations to create a mechanical interlock between the bonding flange and the panel.

12. The stiffened panel of claim 10, wherein the cross-sectional shape of the stiffener further comprises a cap positioned generally parallel to the bonding flange, the web positioned between and generally perpendicular to the cap and the bonding flange, and a second curved connector portion extending between the cap and the web.

13. The stiffened panel of claim 12, wherein the second curved connector portion is positioned to extend beyond the edge of the bondline.

14. A method of stiffening a panel, comprising the steps of:
forming an open-channel stiffener comprising a bonding flange having a width defined by two longitudinal edges for bonding the stiffener to the panel through a bondline formed between the bonding flange and the panel, the stiffener having a cross-sectional shape comprising a curved connector portion extending from one of the longitudinal edges and a web extending from the curved connector portion, the web positioned over the bondline and the curved connector portion positioned to extend beyond an edge of the bondline, and configuring the cross-sectional shape to substantially align a shear center of the stiffener with a centroid of the stiffener and to align the shear center proximate the edge of the bondline; and
bonding the bonding flange of the stiffener to the panel.

15. The method of claim 14, further comprising the step of forming a plurality of perforations through the bonding flange; and wherein the bonding step comprises applying adhesive on a top surface of the bonding flange such that the adhesive flows through the perforations and into the bondline to create a mechanical interlock between the bonding flange and the panel.

16. The method of claim 14, further comprising the step of forming a plurality of raised areas that create a texture on a bonding surface of the bonding flange or the panel to provide a flow path for an adhesive between the bonding flange and the panel.

17. The method of claim 14, wherein the step of forming the stiffener further comprises positioning a cap generally parallel to the bonding flange, positioning the web between and generally perpendicular to the cap and the bonding flange, and a second curved connector portions extending between the cap and the web.

18. The method of claim 17, further comprising positioning the second curved connector portion to extend beyond the edge of the bondline.

19. The method of claim 14, further comprising preparing a bonding surface of the bonding flange prior to bonding the bonding flange to the panel with one or more surface treatments selected from the group consisting of grit blasting, sanding, plasma etching, laser ablation and peel ply.

* * * * *